United States Patent
Keller

(10) Patent No.: US 11,685,263 B2
(45) Date of Patent: Jun. 27, 2023

(54) SYSTEMS AND METHODS FOR MANAGING STALL TORQUE LIMITS

(71) Applicant: Rivian IP Holdings, LLC, Plymouth, MI (US)

(72) Inventor: Lucas Keller, Farmington Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 205 days.

(21) Appl. No.: 17/142,908

(22) Filed: Jan. 6, 2021

(65) Prior Publication Data

US 2022/0212544 A1 Jul. 7, 2022

(51) Int. Cl.
*B60L 15/20* (2006.01)
*B60L 3/10* (2006.01)
*B60L 15/08* (2006.01)
*B60W 10/08* (2006.01)

(52) U.S. Cl.
CPC .............. *B60L 15/20* (2013.01); *B60L 3/102* (2013.01); *B60L 15/08* (2013.01); *B60W 10/08* (2013.01); *B60L 2240/421* (2013.01); *B60L 2240/423* (2013.01); *B60L 2240/463* (2013.01); *B60L 2240/465* (2013.01)

(58) Field of Classification Search
None
See application file for complete search history.

(56) References Cited

U.S. PATENT DOCUMENTS

| | | | |
|---|---|---|---|
| 6,825,624 B2 * | 11/2004 | Anwar | H02P 3/025 318/432 |
| 6,984,949 B2 * | 1/2006 | Sarraillon | B60L 15/2009 318/434 |
| 10,821,977 B1 * | 11/2020 | Stein | B60W 10/08 |
| 11,021,153 B2 * | 6/2021 | Sato | B60L 15/2018 |
| 11,180,035 B2 * | 11/2021 | Jang | B60L 3/12 |
| 11,273,833 B2 * | 3/2022 | Lian | B60W 30/18172 |
| 2016/0244073 A1 * | 8/2016 | Foerster | B60L 15/2081 |
| 2020/0136534 A1 * | 4/2020 | Wu | B60L 7/006 |
| 2022/0080971 A1 * | 3/2022 | Bolger | B60W 30/182 |
| 2022/0126700 A1 * | 4/2022 | Eitzer | B60L 15/20 |

OTHER PUBLICATIONS

Wu et al., "Powertrain Architectures of Electrified Vehicles: Review, Classification and Comparison", Journal of the Franklin Institute, vol. 352(2), Feb. 2015, pp. 425-448. (Year: 2015).*

* cited by examiner

Primary Examiner — Todd Melton
(74) Attorney, Agent, or Firm — Haley Guiliano LLP

(57) ABSTRACT

A system for managing motor torque in a vehicle determines a stall metric corresponding to motor speed and determines a torque limit based on the stall metric. The system determines a desired torque value, and determines whether to generate a modification to one or more baseline torque commands based on the desired torque value and the torque limit. If the baseline torque command is not to be modified, the system generates the one or more baseline torque commands corresponding to one or more motors. If the baseline torque is to be modified, the system generates one or more modified torque commands corresponding to the one or more motors based on the modification and on the one or more baseline torque commands. The modified torque command may include a minimum value that is less than the torque limit and a maximum value that corresponds to a wheel slip torque.

20 Claims, 6 Drawing Sheets

SYSTEMS AND METHODS FOR MANAGING STALL TORQUE LIMITS

INTRODUCTION

The present disclosure is directed towards torque control for electric vehicles, and more particularly towards improved torque control near stall conditions.

SUMMARY

In some embodiments, the present disclosure is directed to a method for managing motor torque in a vehicle. The method includes determining a stall metric corresponding to motor speed, determining a torque limit based on the stall metric, determining a desired torque value, and determining whether to generate a modification to one or more baseline torque commands based on the desired torque value and the torque limit. If the baseline torque command is not to be modified, the method includes generating the one or more baseline torque commands corresponding to one or more motors. If the baseline torque is to be modified, the method includes generating one or more modified torque commands corresponding to the one or more motors based on the modification and on the one or more baseline torque commands.

In some embodiments, generating the one or more modified torque commands includes retrieving reference information, determining a baseline torque command, modifying the baseline torque command to generate the modified torque command based on the reference information, and transmitting the modified torque command to a power electronics system coupled to the one or more motors.

In some embodiments, the modified torque command includes a baseline torque command and at least one of a square wave, a pulse-modulated wave, a pulse density wave, a sawtooth wave, a triangular wave, a sinusoidal wave, or a piecewise functional wave.

In some embodiments, determining whether to generate the modification to the one or more baseline torque commands includes determining a reference operating range, and determining whether the stall metric and the desired torque value are within the reference operating range.

In some embodiments, the one or more modulated torque commands includes a time-average value indicative of the desired torque value.

In some embodiments, the method includes retrieving reference information based on the stall metric, wherein the reference information comprises the torque limit. For example, in some embodiments, the reference information is included in a database or other data structure stored in memory.

In some embodiments, determining the desired torque value includes receiving an input from an operator input interface indicative of the desired torque value.

In some embodiments, the method includes determining a peak torque command corresponding to a wheel slip torque, and causing at least one of the one or more motors to increment in angular position based on the torque command. A peak of the one or more modified torque commands corresponds to the peak torque command. In some embodiments, each of the one or more modified torque commands includes a minimum value that is less than the torque limit, and a maximum value that corresponds to a wheel slip torque.

In some embodiments, the present disclosure is directed to a method for managing motor torque in a vehicle that includes determining an operating range for one or more motors based on a rotational speed and based on a desired torque value, retrieving a reference operating range from memory, and determining a torque command mode based on the operating range and the reference operating range. The method includes applying a first torque command mode if the operating range is within the reference operating range. The method includes applying a second torque command mode if the operating range is not within the reference operating range. In some embodiments, the second torque command includes a baseline command and a modulation.

In some embodiments, the present disclosure is directed to a system for managing motor torque in a vehicle. For example, the system may implement the methods disclosed herein. The system includes a sensor configured to sense motor speed and control circuitry coupled to the sensor. The control circuitry is configured to determine a stall metric corresponding to the motor speed, a torque limit based on the stall metric, a desired torque value, and whether to generate a modification to one or more baseline torque commands based on the desired torque value and the torque limit. If the baseline torque command is not to be modified, the system generates the one or more baseline torque commands corresponding to one or more motors. If the baseline torque is to be modified, the system generates one or more modified torque commands corresponding to the one or more motors based on the modification and on the one or more baseline torque commands. In some embodiments, the system includes a power electronics system coupled to the control circuitry and to the one or more motors. For example, in some embodiments, the power electronics system is configured to receive torque commands from the control circuitry.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to systems and methods for controlling motors of electric vehicles at low to zero speed. To illustrate, when an electric motored vehicle is completely at or very near rest, motor torque can only be generated via continuous electrical current in a limited number of the motor coil phases. Continuous application of electric current on one or more phases of the motor may result in increased heating, and increased temperature, of the motor and power electronics, which could lessen operating life.

Figure 1:
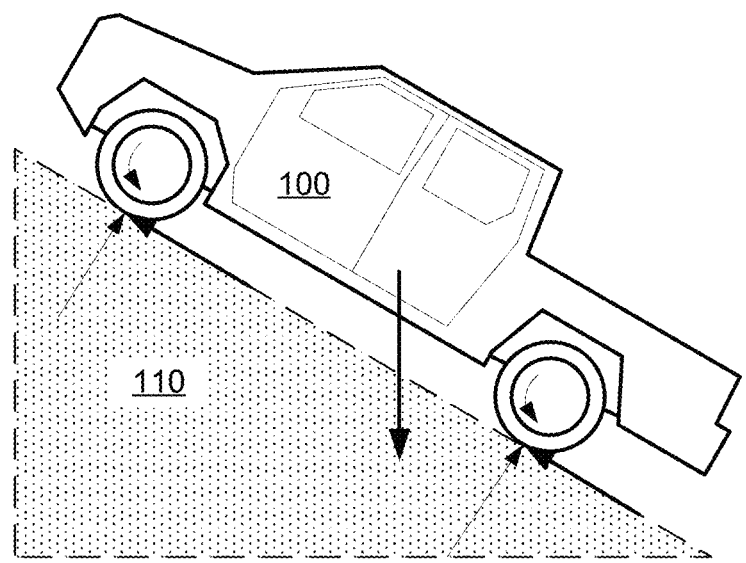
FIG. 1 shows a perspective view of an illustrative vehicle near stall, in accordance with some embodiments of the present disclosure.

FIG. 1 shows a perspective view of illustrative vehicle 100 near stall, in accordance with some embodiments of the present disclosure. As illustrated, vehicle 100 is arranged on incline 110 (e.g., during ascent of a hill, off-roading, bouldering), although the present disclosure may be applied to a vehicle traversing any flat or inclined surface. For example, when on an incline, a driver may request increased torque to transition from a rest position to some movement (e.g., by actuating a foot pedal). Because vehicle 100 is at rest, the torque required to maintain the zero speed condition may depend on the incline, the weight of vehicle 100, the characteristics of the ground, or a combination thereof. Further, because at or near stall conditions correspond to relatively low rates of rotation, the constant current may be disproportionately applied to a particular phase, which can lead to overheating (e.g., thus requiring some torque derating, as prescribed by the motor specifications in some circumstances). As illustrated in FIG. 1, the forces acting on the vehicle include gravity, normal force from the ground, static friction, and dynamic friction (e.g., if the vehicle exhibits some non-zero speed), while torque from the electric motors exerts a force at the contact area between the wheels of vehicle 100 and incline 110. The systems and method of the present disclosure are directed to improving torque capabilities of vehicle 100 at or near stall conditions.

Figure 2:
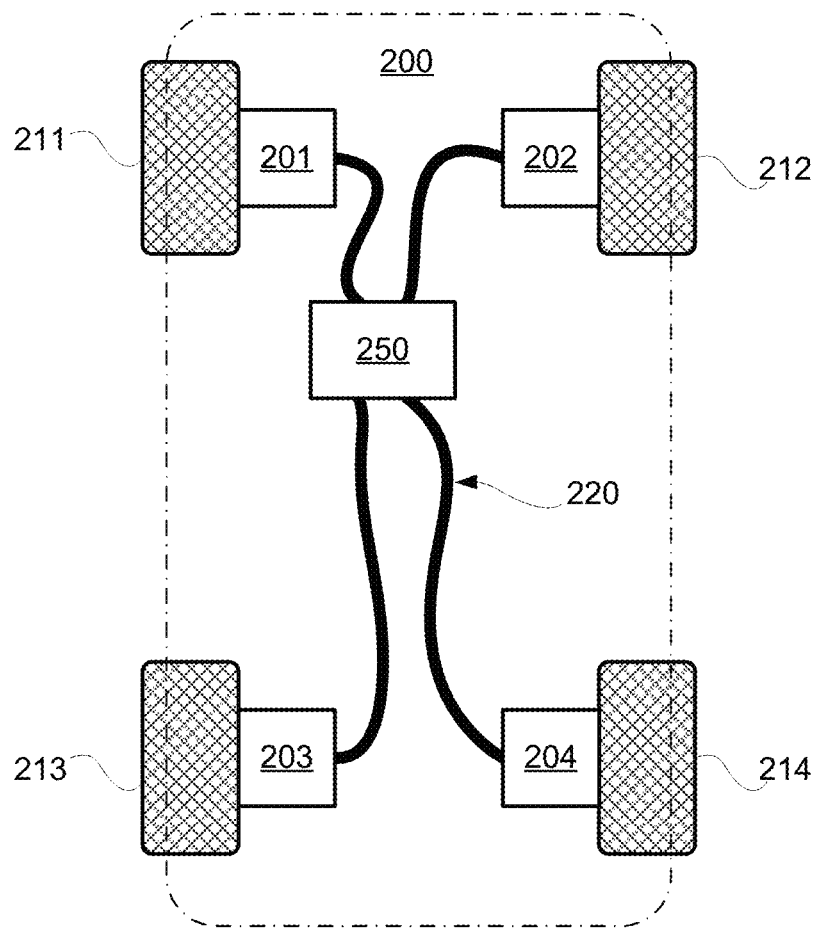
FIG. 2 shows a system diagram of an illustrative vehicle having multiple motors, in accordance with some embodiments of the present disclosure.

FIG. 2 shows a system diagram of illustrative vehicle 200 having multiple motors, in accordance with some embodiments of the present disclosure. To illustrate, vehicle 200 may be the same as vehicle 100 of FIG. 1. Motor assemblies 201, 202, 203, and 204 may each include an electric motor, a gearbox (e.g., a reduction gearset or pulley set), a shaft coupling (e.g., to one of wheels 211-214, as illustrated), auxiliary systems (e.g., a lubricating oil system, a cooling system, a power electronics system), any other suitable components, or any combination thereof. As illustrated, each of motor assemblies 201-204 is coupled to control system 250 via couplings 220, which may include power leads, control wires, sensor wires, communications buses, any other suitable coupling types, or any combination thereof. For example, in some embodiments, control system 250 includes a battery pack or is otherwise coupled to a battery pack and is configured to provide electrical power (e.g., current) to electric motors of motor assemblies 201-204.

Control system 250 may be configured to generate torque commands for each of motor assemblies 201-204. In some embodiments, control system 250 generates control signals for each of motor assemblies 201-204. The control signals may include messages, current values, pulse width modulation (PWM) values, any other suitable values, any other information indicative of a desired operation, or any combination thereof. For example, control system 250 may include a speed controller (e.g., a proportional-integral-derivative (PID) feedback controller), a torque controller, a current controller (e.g., per motor phase of each motor), a position controller, any other suitable controllers, or any combination thereof.

In some embodiments, control system 250 is configured to bring the electric motors of one or more of motor assemblies 201-204 to rest strategically between two phases, which then share the load when the current is supplied. In some embodiments, the cooling capacity of an electric motor (e.g., of motor assemblies 201-204) for any given stall torque requirement is vastly reduced as compared to when the motor shaft is rotating. Accordingly, the continuous stall torque capacity may be limited due to the buildup of excessive heat. Once the motor shaft begins a very low rotational speed, the torque is then supported evenly by all coil phases over time and the continuous torque rating may be increased. In vehicles utilizing two or more motors (e.g., vehicle 200 includes four motors, as illustrated), the present disclosure provides a strategy to mitigate this phenomenon and increase continuous stall torque capacity. For purposes of illustration, vehicle 200 is a four-wheeled vehicle having one motor for each wheel. In some circumstances, such as illustrated in FIG. 1, vehicle 200 may be stopped on a significant grade (e.g., on incline 110 of FIG. 1), wherein the surface may be off-road and rocky. Vehicle 200 may attempt to climb the grade using motor assemblies 201-204 to apply torque to each of wheels 211-214.

Figure 3:
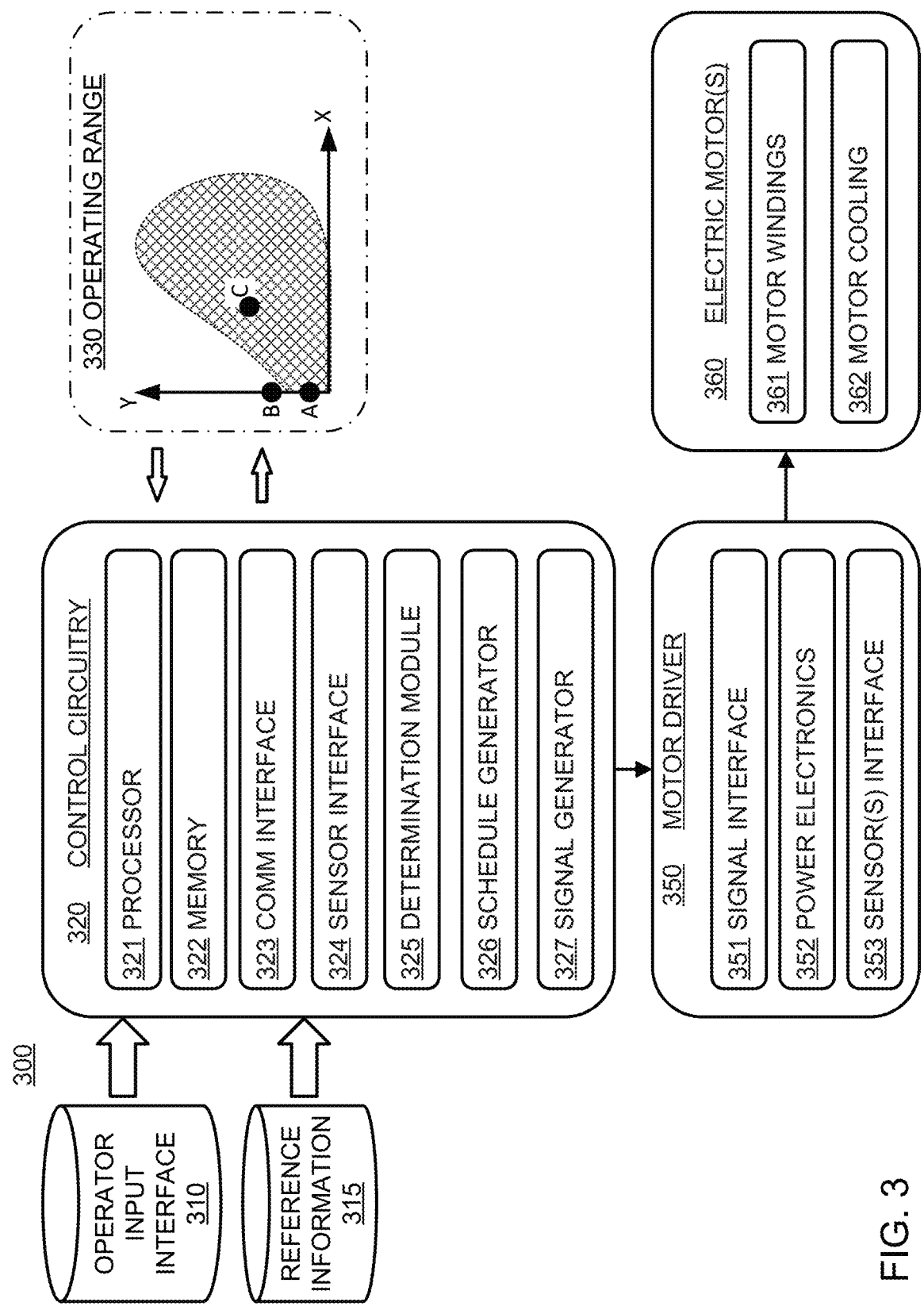
FIG. 3 shows a system diagram for an illustrative system for managing wheel torque, in accordance with some embodiments of the present disclosure.

FIG. 3 shows a system diagram for illustrative system 300 for managing wheel torque, in accordance with some embodiments of the present disclosure. To illustrate, system 300 may be implemented as control system 250 of FIG. 2, or a part thereof, for controlling electric motors of a vehicle (e.g., vehicle 100 of FIG. 1 or vehicle 200 of FIG. 2). As illustrated, system 300 includes control circuitry 320, operator input interface 310, reference information 315, motor driver 350, and electric motor(s) 360.

Control circuitry 320, as illustrated, includes processor 321, memory 322, communications (COMM) interface 323, sensor interface 324, determination module 325, schedule generator 326, and signal generator 327. Processor 321 may include any suitable processing equipment such as a central processing unit having single core or dual core, bus, logic circuitry, integrated circuitry, digital signal processor, graphics processor, any other suitable components for reading and executing computer instructions, or any combination thereof. Memory 322 may include any suitable storage device such as, for example, volatile memory, non-volatile memory, a removable storage device, a solid state storage device, an optical device, a magnetic device, any other suitable component for storing and recalling information, or any combination thereof. COMM interface 323 may include electrical terminals, level shifters, a communications module, connectors, cables, antennas, any other suitable components for transmitting and receiving information, or any combination thereof. For example, COMM interface 323 may include an ethernet interface, a WiFi interface, an optical interface, any other suitable wired or wireless interface, or any combination thereof. Sensor interface 324 may include a power supply, analog-to-digital converter, digital-to-analog converter, signal processing equipment, signal conditioning equipment, connectors, electrical terminals, any other suitable components for managing signals to and from a sensor, or any combination thereof. For example, sensor interface 324 may be configured to communicate with a current sensor, a position sensor (e.g., a rotary encoder coupled to the motor shaft or gear shaft), a temperature sensor, a voltage sensor, an accelerometer (e.g., a vibration sensor), any other suitable sensor, or any combination thereof. Determination modules 325 is configured to determine whether to modify a torque command or apply a constant torque command. Schedule generator 326 may be implemented in hardware, software, or a combination thereof to generate torque schedules as sequences of values (e.g., if determination module 325 determines to generate a non-constant or otherwise modified torque schedule). Signal generator 327 is configured to transmit a control signal indicative of the torque schedule generated by schedule generator 326 to motor driver 350, a motor controller, any other suitable processing equipment or communications interface, or any combination thereof. For example, signal generator 327 may convert values of the torque schedule to voltages, bits, messages, or any other suitable data for transmitting to a receiver (e.g., of signal interface 351). Signal generator 327 may generate, for example, an electrical signal, an electromagnetic signal (e.g., via photons of any suitable wavelength including radio, visible, or infrared), any other suitable signal, or any combination thereof.

In an illustrative example, reference information 315 may include a reference operating range, a speed-torque mapping, torque limits, temperature limits, equipment information, operator information, threshold or limit values, baseline torque schedules, torque command modifications (e.g., modulations), torque functions (e.g., or parameters thereof), any other suitable reference information, or any combination thereof. For example, reference information 315 may include a reference operating range that includes a set of coordinate pairs (e.g., or higher dimension sets) of operating parameter values that define an intended operating range. The operating parameters may include speed (e.g., rpm, rotational velocity, or angular velocity of a motor or wheel attached thereto), torque (e.g., force×distance, force), current (e.g., current in a motor phase, total motor current), temperature (e.g., coolant temperature, motor winding temperature, power electronics temperature), any other suitable parameter, or any combination thereof. To illustrate, operating range 330 illustrates a two-dimensional operating range with points A, B, and C. In a further example, reference information 315 may include a speed-torque mapping that includes a mapping of speed values and torque values (e.g., a functional mapping, a set of ordered pairs), which may define a torque limit as a function of speed (e.g., motor speed or wheel speed). In a further example, reference information 315 may include torque limits such as values (e.g., one or more values optionally indexed by speed), torque-parameter mappings (e.g., functional mappings or lookup tables of torque and temperature, speed, or another parameter), proportionality constants (e.g., in units of torque/speed), any other suitable limits, or any combination thereof. In a further example, reference information 315 may include temperature limits such as coolant temperature limits, power electronics temperature limits, motor winding temperature limits, any other suitable temperature limits, or any combination thereof. In a further example, reference information 315 may include equipment information that includes manufacturer prescribed limits, current capacities, torque capacities, torque limits mapped to a parameter (e.g., speed, temperature), peak torque value, peak current value, natural frequency (e.g., of a vehicle component or system), any other suitable information about a motor or power electronics, or any combination thereof. In a further example, reference information 315 may include operator information such as operator preferences, predetermined limits, one or more selectable modes, any other suitable information corresponding to an operator or selected by an operator, or any combination thereof. In a further example, reference information 315 may include threshold or limit values such as current limits temperature limits, torque limits, speed limits, frequency limits, time limits, any other suitable limits, or any combination thereof. In a further example, reference information 315 may include baseline torque schedules such as constant values, baseline values, modification schedules (e.g., functions or modulations), waveforms, piecewise functions, pulse types, frequency values, period values, duration values, any other suitable information for determining a torque schedule, or any combination thereof. In a further example, reference information 315 may include torque command modifications (e.g., modulations), torque functions (e.g., piecewise functions defined over a domain), any other suitable information for modifying a baseline torque command, frequency information, or any combination thereof. To illustrate, torque functions may include peaks, pulses, wavelets, sinusoidal functions, polynomials, piecewise functions, any other suitable functions, or any combination thereof.

In an illustrative example, referencing operating range 330, if the X and Y dimensions correspond to speed and torque, respectively, then point A refers to a zero-speed torque command within the operating range, point B refers to a zero-speed torque command outside of the operating range, and point C refers to a particular speed torque command that is within the operating range. In some embodiments, during operation at points A or C, the system need not modify the torque command. In some embodiments, the system determines that point B is not operable, or is otherwise only temporarily operable. For example, in some embodiments, if an operating point is desired at point B, the system may modify, limit, or otherwise reduce the torque command to fall within the operating region. In some embodiments, if the desired operating point is near a boundary of the operating range (e.g., within a given interval of torque, speed, or other parameter), the system may determine to modify (e.g., modulate) the torque command to prevent overheating of the motor.

Motor driver 350, as illustrated, includes signal interface 351, power electronics 352, and sensor(s) interface 353. Signal interface 351 is configured to receive control signals from control circuitry 320. For example, signal interface 351 may include electrical terminals, an amplifier, a filter, a signal conditioner, a level shifter, an analog to digital converter, an antenna, a cable, any other suitable hardware or software components, or any combination thereof. For example, the control signal may include a PWM signal, a pulse density modulated (PDM) signal, an analog signal, a square wave, a modulated carrier signal, any other suitable signal, or any combination thereof. In a further example, the control signal may be transmitted using a wired interface, wireless interface, optical interface, any other suitable interface, or any combination thereof. Power electronics 352 may include IGBTs, MOSFETs, switches, diodes, any other suitable components, or any combination thereof. For example, in some embodiments, power electronics 352 includes one or more H-bridge circuits (e.g., arranged electrically between DC buses) or half-bridge circuits (e.g., with a delta wye or star neutral connection). Sensor(s) interface 353 may include one or more sensors, a power supply, an interface for receiving and processing sensor signals, any other suitable components, or any combination thereof. For example, sensor(s) interface 353 may include current sensors (e.g., DC bus current, motor phase current), temperature sensors (e.g., indicative of a temperature of a switch or other current-carrying device), voltage sensors, speed sensors (e.g., coupled to one or more electric motors 360), any other suitable sensors for sensing any suitable parameter, or any combination thereof.

Electric motor(s) 360 includes one or more electric motors that each include motor windings 361 and optionally motor cooling 362. For example, in some embodiments, each of one or more electric motors 360 includes motor windings 361 that correspond to one or more phases of the respective motor. To illustrate, electric motor(s) 360 may include three-phase motors, four-phase motors, DC motors, switched reluctance motors, any other suitable motor having any suitable commutation, or any combination thereof. Motor cooling 362 may include, for example, a cooling jacket, a housing having passages for coolant, cooling fins, any other suitable components, or any combination thereof. To illustrate, a cooling system having a pump and reservoir may be coupled to motor cooling 362 to maintain, reduce, or otherwise control a temperature of electric motor(s) 360.

In an illustrative example, a vehicle may include system 300, including control circuitry 320, motor driver 350, and electrical motor(s) 360. Reference information 315 may be included in memory 322, or may be retrieved from an external source via COMM interface 323 (e.g., via a wired or wireless interface). The vehicle may include a pedal that serves as operator input interface 310, to provide an operator request for torque.

In a further illustrative example, a motor of electrical motor(s) 360 may have a corresponding set of specifications such as including four coil phases, a 60 Nm continuous stall rating, and a 90 Nm continuous torque limit at low speeds. The systems and method of the present disclosure may provide the ability to increase a stall torque thermal limit up to the RMS thermal limit for liquid-cooled (e.g., or air-cooled) electric motors. To illustrate, in some circumstances, the vehicle can stop and start on steeper continuous grades when the torque limit would have otherwise been applied, which may be useful for off-road operation.

Figure 4:
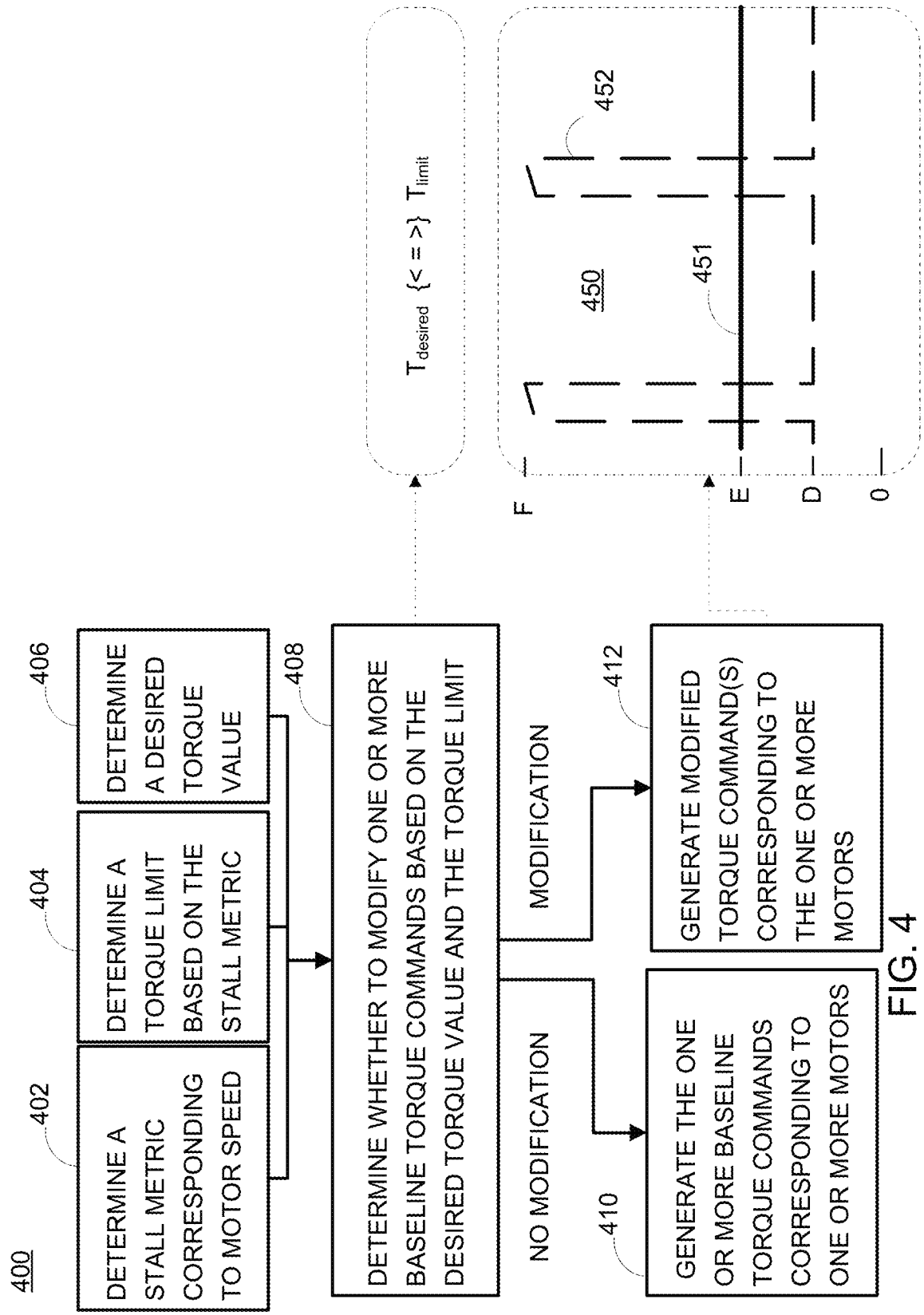
FIG. 4 shows a flowchart of an illustrative process for managing wheel torque, in accordance with some embodiments of the present disclosure.

FIG. 4 shows a flowchart of illustrative process 400 for managing wheel torque, in accordance with some embodiments of the present disclosure. To illustrate, in some embodiments, process 400 may be implemented using system 300 of FIG. 3.

Step 402 includes the system determining a stall metric corresponding to motor speed. In some embodiments, the stall metric may include a motor speed, a motor position, wheel speed, gear speed (e.g., of a gearbox intermediate to the motor and wheel), any other suitable speed, or any combination thereof. The stall metric may be indicative of an rpm value, an angular position, an angular velocity, an angular increment (e.g., a cogging increment or phase increment), any other suitable indicator of angular position information, or any combination thereof. To illustrate, the system may determine an effective rpm value by time-averaging, sampling (e.g., selecting a single sample value), sample averaging, applying an rms calculation, applying a filter, applying any other suitable technique to indicate speed, or any combination thereof. The system may determine the stall metric based on one or more encoders, speed sensors, magnetic pickups, optical systems, image-based systems, any other suitable sensors for sensing speed or angular position, or any combination thereof. In some embodiments, a vehicle may include a plurality of motors, and the system may determine a stall metric for each motor of the plurality of motors.

Step 404 includes the system determining a torque limit based on the stall metric. In some embodiments, the system may determine the torque limit by retrieving or otherwise accessing reference information (e.g., reference information 315 of FIG. 3). The torque limit may be predetermined based on temperature limits of the motor, cooling capacity, and expected heat generation from phase currents. In some embodiments, the torque limit is retrieved from a lookup table (e.g., stored in memory 322 of FIG. 3). In some embodiments, a vehicle may include a plurality of motors, and the system may determine a torque limit for each motor of the plurality of motors.

Step 406 includes the system determining a desired torque value. In some embodiments, the desired torque value is determined based on an operator input (e.g., at operator input interface 310). In some embodiments, a vehicle may include a plurality of motors, and the system may determine a desired torque value for each motor. For example, the system may implement torque vectoring to provide more torque to particular wheels (e.g., front wheels, rear wheels, wheels having a higher coefficient of friction with the ground). In some embodiments, the system determines a desired torque value corresponding to a period of time. For example, the system may update or latch the desired torque value at any suitable frequency or interval.

Step 408 includes the system determining whether to modify one or more torque commands based on the desired torque, the torque limit, an operating range, any other suitable criteria, or any combination thereof. In some circumstances, the desired torque value of step 406 may be near, or may exceed, the torque limit of step 404. In some such circumstances, the system may determine whether to apply the desired torque value with respect to the potential for overheating the motor. In some embodiments, the system determines whether to the apply the desired torque value directly, or modify the applied torque value to prevent exceeding the motor capacity. In some embodiments, the system compares the desired torque value to the torque limit for each motor, and then, based on the comparison, determines whether to modify the applied torque command.

In some embodiments, at step 408, the system compares the desired torque value to the torque limit for each motor, and if the desired torque value exceeds the torque limit, the system determines that modification is to be applied. In some embodiments, at step 408, the system compares the desired torque value to the torque limit for each motor, and if the desired torque value is within a threshold of the torque limit (e.g., within 10%, 5%, or 1%, or within an offset value of X Nm), the system determines that modification is to be applied. In some embodiments, the system may access reference information (e.g., reference information 315 of FIG. 3), which may contain a lookup table, a functional mapping, or any other suitable algorithm for determining whether to modify the torque command. If the system determines not to the modify the applied torque command, the system may proceed to step 410. If the system determines to the modify the applied torque command, the system may proceed to step 412.

Step 410 includes the system generating one or more baseline torque commands corresponding to one or more motors. In some embodiments, the system generates a torque command for each motor. In some embodiments, the system generates a torque command for each phase of each motor. To illustrate, in some embodiments, the system determines that no modification is needed at step 408, and at step 410, the system generates a torque command that is equivalent to the desired torque value of step 406 for each motor (e.g., which may be, but need not be, the same).

Step 412 includes the system generating one or more modified torque commands corresponding to one or more motors. In some embodiments, step 412 may include transmitting the torque command to power electronics of a motor driver (e.g., motor driver 350). In some embodiments, step 412 includes transmitting, or otherwise inputting, the torque command to a motor controller (e.g., a PID controller, a feedforward controller) as an input for controlling the position, speed, torque, or a combination thereof of the motor. In some embodiments, the system generates the modified torque commands based on a baseline torque value and on a modification. In some embodiments, for example, the system determines a torque schedule having temporal character that is configured to avoid overheating each motor while provided an effective torque value equivalent to the desired torque value. For example, the torque schedule may include pulses, peaks, or other features that exceed the effective value, as well as valleys, nadirs, or other regions that are less than the effective value. In a further example, the system may determine a baseline torque value and modulate the baseline value with a pulse, peak, wave, or other feature to increase the effective torque value without exceeding the torque limit for an extended period of time.

As shown in panel 450, the system may apply a torque schedule. In panel 450, the abscissa is indicative of time (e.g., time, sample index), and the ordinate is indicative of torque. To illustrate, referencing panel 450, the system may determine a desired torque value corresponding to torque schedule 451, which may coincide with a torque limit indicated by E. The system may determine to apply torque schedule 452 to prevent prolonged operation at the torque limit. As illustrated, the system may generate a torque schedule having a baseline value, indicated by D, and a modulation that includes pulses having a peak value indicated by F. The effective torque value of torque schedule 452 is equivalent to torque schedule 451, but may limit the susceptibility of the motor to overheating. In some embodiments, the peak value F is determined to cause the motor to increment in position, which results in a non-zero motor speed (e.g., an effective speed or average speed) and thus a potential increase in the torque limit. To illustrate, the peaks of torque schedule 452 may just reach or exceed value F, which may cause the motor to increment to the next motor phase or other suitable increment. Because the torque schedule then decreases to the baseline value indicated by D, the increment is small (e.g., a few degrees of wheel motion or less). The incremental motion may help spread the cooling load among phases but change the current demand in each phase such that the current in any one phase is not held at a large value relative to the other phases over a prolonged time. Although illustrated as peaks and a baseline in panel 450, the system may generate any suitable torque schedule. For example, the system may modulate a baseline signal, generate a signal based on a function, generate a piecewise signal, generate any other suitable torque schedule, or any combination thereof. In some circumstances, process 400 allows the system to avoid overheating the motors, without modifying a feedback motor controller, by modifying the torque schedule that is inputted to the motor controller. To illustrate, a PID controller may be used to control the motor position and speed, and rather than modifying the controller, process 400 allows the input to the controller to be modified to improve the torque limit at low speed or stall.

Figure 5:
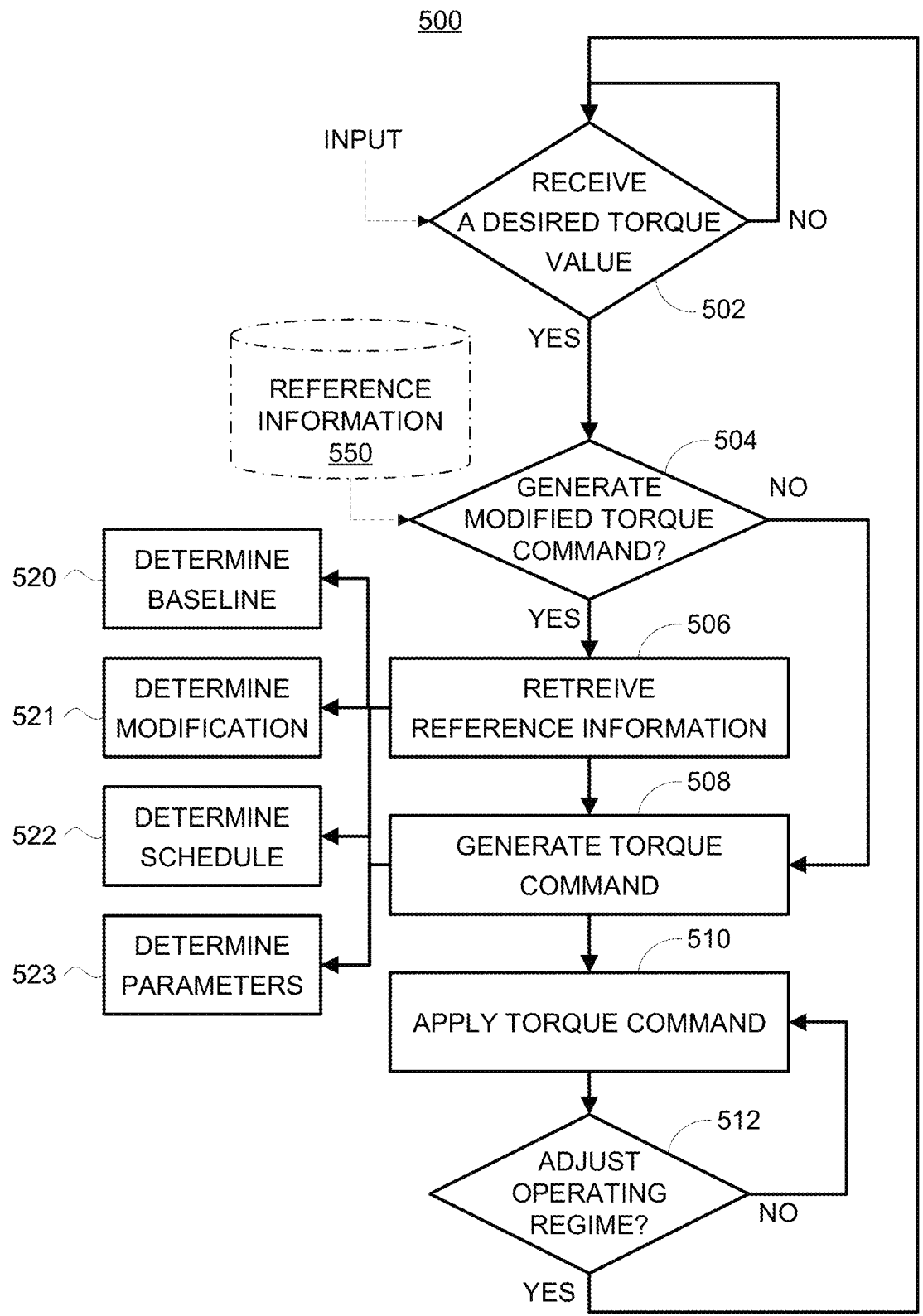
FIG. 5 shows a flowchart of an illustrative process for managing wheel torque based on reference information, in accordance with some embodiments of the present disclosure.

FIG. 5 shows a flowchart of illustrative process 500 for managing wheel torque based on reference information, in accordance with some embodiments of the present disclosure. To illustrate, in some embodiments, process 500 may be implemented using system 300 of FIG. 3. It will be understood that processes 400 and 500 may be combined in any suitable way, in accordance with some embodiments of the present disclosure.

At step 502, the system receives a desired torque value. In some embodiments, the desired torque value is determined based on an operator input (e.g., at operator input interface 310). In some embodiments, a vehicle may include a plurality of motors, and the system may determine a desired torque value for each motor based on the received desired torque value. For example, the system may implement torque vectoring to provide more torque to particular wheels (e.g., front wheels, rear wheels, wheels having a higher coefficient of friction with the ground), and may receive the desired torque command from a torque control module. In some embodiments, the system receives the desired torque value at a particular frequency (or period), in response to an event (e.g., to a sample time), any other suitable regular or irregular interval, or any combination thereof. For example, the system may update or latch the desired torque value at any suitable frequency or interval. To illustrate, the operator may press an accelerator pedal of the vehicle, and the system may determine the desired torque value based on the pedal actuation.

At step 504, the system determines whether to generate a modified torque command. In some embodiments, the system compares the desired torque command and reference information 550 to determine whether to generate a modified torque command. In some embodiments, reference information 550 may include any of the illustrative information of reference information 315 of FIG. 3, and may be stored in memory (e.g., memory 322 of FIG. 3). In some embodiments, the system determines whether to generate a modified torque command based on a desired torque, a torque limit, an operating range, any other suitable criteria, or any combination thereof. In some embodiments, the system compares the desired torque value to the torque limit for each motor, and then, based on the comparison, determines whether to modify the applied torque command. In some embodiments, the system compares the received desired torque value to a torque limit for each motor, and if the desired torque value exceeds the torque limit, the system determines that modification is to be applied. In some embodiments, the system may access reference information (e.g., reference information 550), which may contain a lookup table, a functional mapping, or any other suitable algorithm for determining whether to modify the torque command. If the system determines not to the modify the applied torque command, the system may proceed to step 508 (e.g., to generate a torque command based on the desired value without modification). If the system determines to generate a modified torque command, the system may proceed to step 506.

At step 506, the system retrieves or otherwise accesses reference information. In some embodiments, step 504 and step 506 may be combined into a single step, wherein information from reference information 550 is used to determine whether to generate a modified torque command, and to generate the torque command itself. In some embodiments, reference information 550 may be stored in memory of the system. In some embodiments, reference information 550 may include a lookup table, a functional mapping, limits (e.g., a current limit, a torque limit, a temperature limit, a speed limit), thresholds or ranges (e.g., an operating range), an algorithm or other computer implemented instructions, any other suitable information, or any combination thereof.

At step 508, the system generates a torque command based on the reference information of step 506. In some embodiments, the system implements a predetermined algorithm based on stored computer instructions to generate the torque command. The torque command may include a constant value, or may be based on a torque schedule having peaks as determined based on the desired torque value.

As illustrated, in some embodiments, step 506, step 508, or both may include any or all of steps 520-523. At step 520, the system determines one or more baseline torque values. At step 521, the system determines one or more modifications. At step 522, the system determines one or more torque schedules. At step 523, the system determines one or more parameters for use in generating a torque command. For example, the system may identify one or more modifications at step 521, which may include one or more peak shapes, wave shapes, pulses, or any other suitable shape, and determine a baseline value at step 520 that when combined with the modification at step 522 results in an effective torque value (e.g., a time-averaged value, a sample-averaged value, an rms value). In a further example, the system may determine a modification at step 521 and then determine one or more parameters at step 523 such as peak height, peak duration, frequency, or any other suitable parameter.

At step 510, the system applies the torque command. In some embodiments, at step 510, the system generates a control signal based on the torque command. For example, in some embodiments, the system inputs the torque command into a motor controller, which then generates a control signal for applying current to one or more electric motors. In a further example, the system may generate and transmit a control signal indicative of the torque command itself rather than inputting the torque command into a separate controller. In some embodiments, the system may transmit a control signal to power electronics to cause current to flow in one or more phases of each motor. In some embodiments, the power electronics may include an H-bridge, a half-bridge, or a combination thereof. In some embodiments, the control signal may include a PWM signal, a PDM signal, an analog signal, a series of pulses, a wave, a modulated wave, a digital signal (e.g., a serial or parallel signal), any other suitable signal, or any combination thereof. In some embodiments, step 510 may include generating a communications signal and transmitting the communications signal to a motor driver via a communications interface. To illustrate, step 510 may include causing a phase lead coupled to a phase of an electric motor to be coupled to a bus lead for a period of time (e.g., via PWM activation).

At step 512, the system determines whether to adjust the operating regime. For example, as the torque command is applied and the wheel increments in angular position, the desired torque changes, or a combination thereof, the system may determine whether to continue to apply the torque command in the same manner, or whether to re-evaluate modifying the torque command. In some embodiments, the system receives one or more sensor signals at step 512 to determine whether to adjust the operating regime. In some embodiments, the system may continue to apply the torque command generated at 510 until the system decides to adjust the operating regime. The system may select between modified and unmodified torque commands based on any suitable criteria.

FIGS. 6-9 show illustrative torque schedules that may be applied to motors of an electric vehicle. For example, the illustrative torque schedules of FIGS. 6-9 may be generated during process 400 of FIG. 4 or process 500 of FIG. 5. In a further example, the illustrative torque schedules of FIGS. 6-9 may be generated by system 300 of FIG. 3 (e.g., while implementing process 400, process 500, any other suitable process, or a combination thereof). In a further example, the illustrative torque schedules of FIGS. 6-9 may be used to control torque of vehicle 100 of FIG. 1 or vehicle 200 of FIG. 2.

Figure 6:
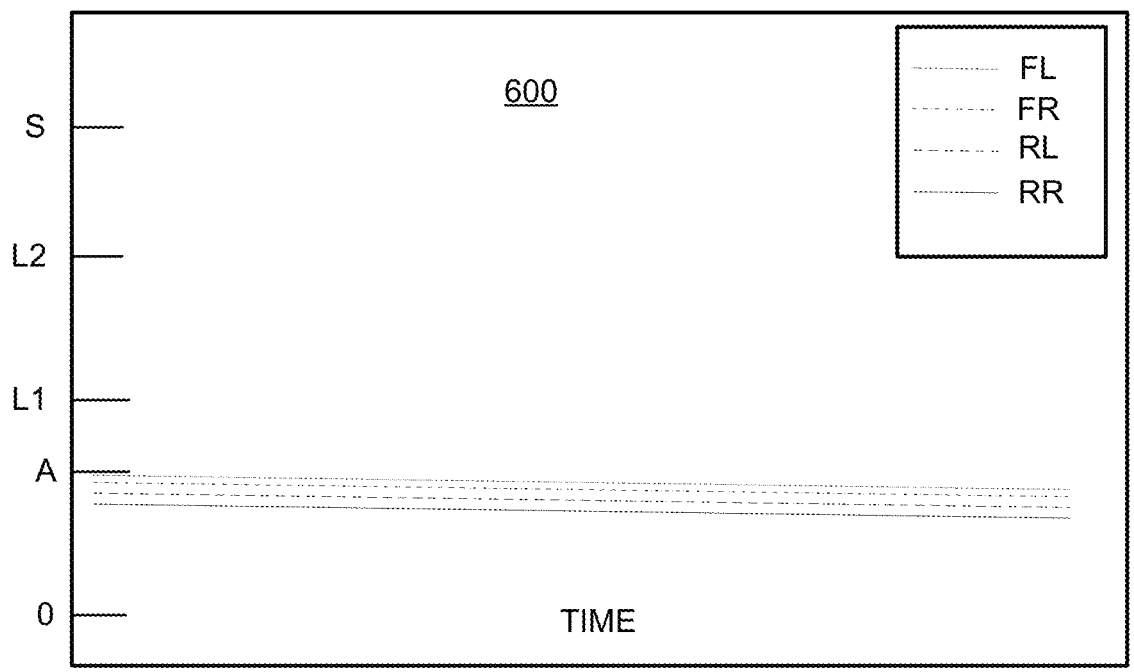
FIG. 6 shows a plot of an illustrative torque schedule for a multi-motor system, below the continuous stall torque limit, in accordance with some embodiments of the present disclosure.

FIG. 6 shows plot 600 of an illustrative torque schedule for a multi-motor system, below the continuous stall torque limit, in accordance with some embodiments of the present disclosure. As illustrated in plot 600, torque is shown as a function of time for four motors, corresponding to front left (FL), front right (FR), rear left (RL), and rear right (RR). For example, the motors designated by FL, FR, RL, and RR may correspond to motor assemblies 201, 202, 203, and 204 of FIG. 2, respectively. As illustrated in plot 600, the abscissa is in units of time (e.g., not indicated in plot 600), while the ordinate is in units of torque (e.g., Nm or other suitable unit), per motor, normalized in any suitable manner. In plot 600, "A" corresponds to a first torque command for a motor, "L1" refers to a stall torque capacity for a motor, "L2" refers to a near-stall torque capacity for a motor, and "S" refers to a wheel slip torque (e.g., which may depend on characteristics of the ground and tire).

As illustrated in FIG. 6, a torque command of A is requested for each wheel by the system. Because the torque command of A is less than the stall torque capacity of L1 (e.g., maximum torque capacity at zero speed), the system applies a constant torque command to each wheel (e.g., via each respective electric motor of each respective motor assembly). In some embodiments, while the torque command is less than L1, the torque schedule includes constant torque values distributed evenly to all motors. In some circumstances, a constant torque may be applied to each motor, but the torques need not be the same (e.g., in torque-vectoring circumstances wherein one or more motors is provided more or less torque). As illustrated, the torque values for each motor in plot 600 are slightly different for illustration purposes, although in some circumstances the requested torque may be identical for each motor, or may vary more significantly than illustrated in FIG. 6.

Figure 7:
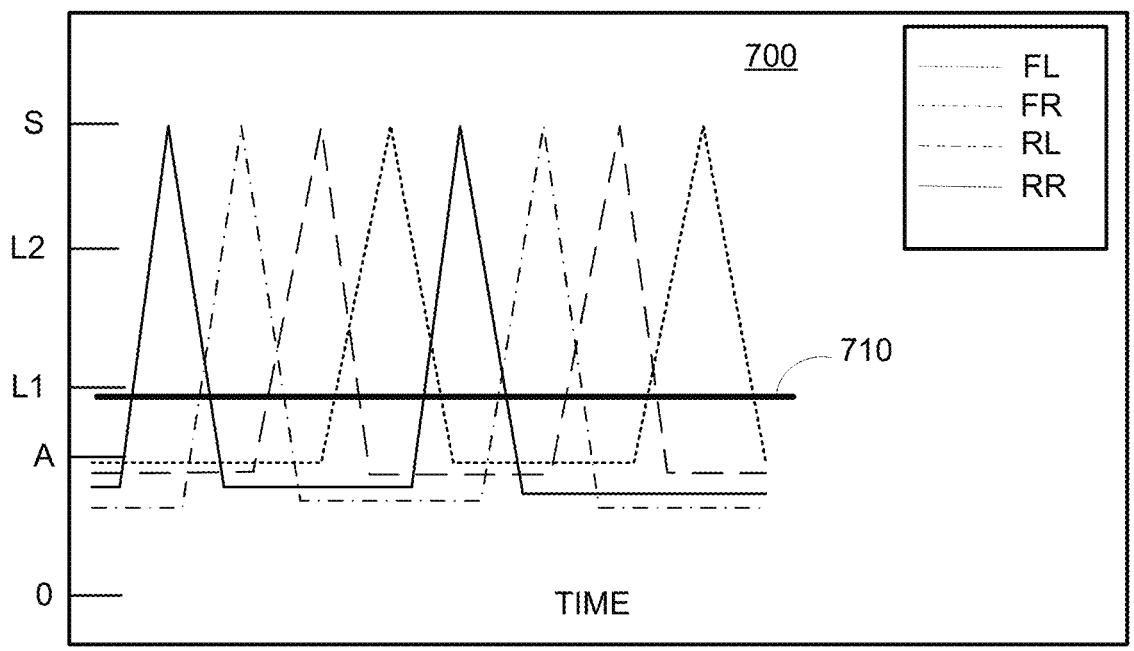
FIG. 7 shows a plot of an illustrative torque schedule for a multi-motor system, at or near the continuous stall torque limit, in accordance with some embodiments of the present disclosure.

FIG. 7 shows plot 700 of an illustrative torque schedule for a multi-motor system, at or near the continuous stall torque limit, in accordance with some embodiments of the present disclosure. As illustrated in plot 700, and similar to plot 600, torque is shown as a function of time for four motors (e.g., corresponding to FL, FR, RL, and RR). As illustrated in plot 700, the abscissa is in units of time (e.g., having any suitable scale), while the ordinate is in units of torque (e.g., Nm), per motor, normalized in any suitable manner. In plot 700, similar to plot 600, "A" corresponds to a first torque command for a motor, "L1" refers to a stall torque capacity for a motor, "L2" refers to a near-stall torque capacity for a motor, and "S" refers to a wheel slip torque (e.g., which may depend on characteristics of the ground and tire). As the desired torque increases to near the torque limit, or beyond, the system may determine to modify the torque schedule from a constant value to a modified value.

For example, if one or more motors has been thermally de-rated to its continuous condition limit, and the vehicle is in a stall situation, the system may modify the torque command to accommodate the limit. In some embodiments, if an operator requests a motor torque approaching the continuous stall torque limit, the torque command may be augmented. For example, as illustrated in plot 700, the average torque at each motor is no greater than the continuous stall rating, as illustrated by the line 710. In the context of plot 700, the system has generated a modified torque command for each motor that includes a baseline torque value modulated with triangular peaks, as illustrated. In some embodiments, the characteristic frequency of the peaks occurs at well over the vehicle's natural frequency response to any type of body movement (e.g., and may also be tailored to minimize noise and vibration). For example, the system may determine a frequency of the modulation to avoid exciting modes of the vehicle (e.g., to prevent or mitigate perceptibility of the modulation by the operator).

As illustrated, the torque schedule for each motor includes a peak (e.g., a triangular peak as illustrated, but any suitable modulation may be used). As illustrated, the peak is approximately equal to the wheel slip torque at which the wheel just begins to move by overcoming friction. In some embodiments, the peak torque of the torque schedule is selected to achieve very small wheel movements allowing for each motor to move only to the next phase. Depending on the gear ratio (e.g., from motor to wheel), the incremental movement could be as little as a few degrees of wheel rotation. For example, a 30° rotation of the motor and gear reduction of 10/1 would result in a 3° wheel rotation (e.g., about 1.3 cm for a 0.5 m diameter wheel). In some embodiments, the lower values of the torque schedule (e.g., the torque valleys) are adjusted to ensure the average torque output meets the operator request (e.g., the desired torque), without overheating due to the stall torque limit (e.g., stall torque rating or capacity).

Referencing both plots 600 and 700, as the torque command increases from a value below the stall torque limit (e.g., within a predetermined operating range) to a value near or exceeding the stall torque limit (e.g., near or outside of the predetermined operating range), the system may determine to modify the torque command. As illustrated, the system applies a modulation (e.g., a pulse, illustrated as a triangular pulse) to a baseline signal (e.g., the lower, flat torque values, as illustrated). In some embodiments, the system need not modulate a baseline signal, and may generate a torque schedule having a predetermined shape (e.g., scaled, offset, or otherwise tailored to result in an average value that corresponds to the torque command).

Figure 8:
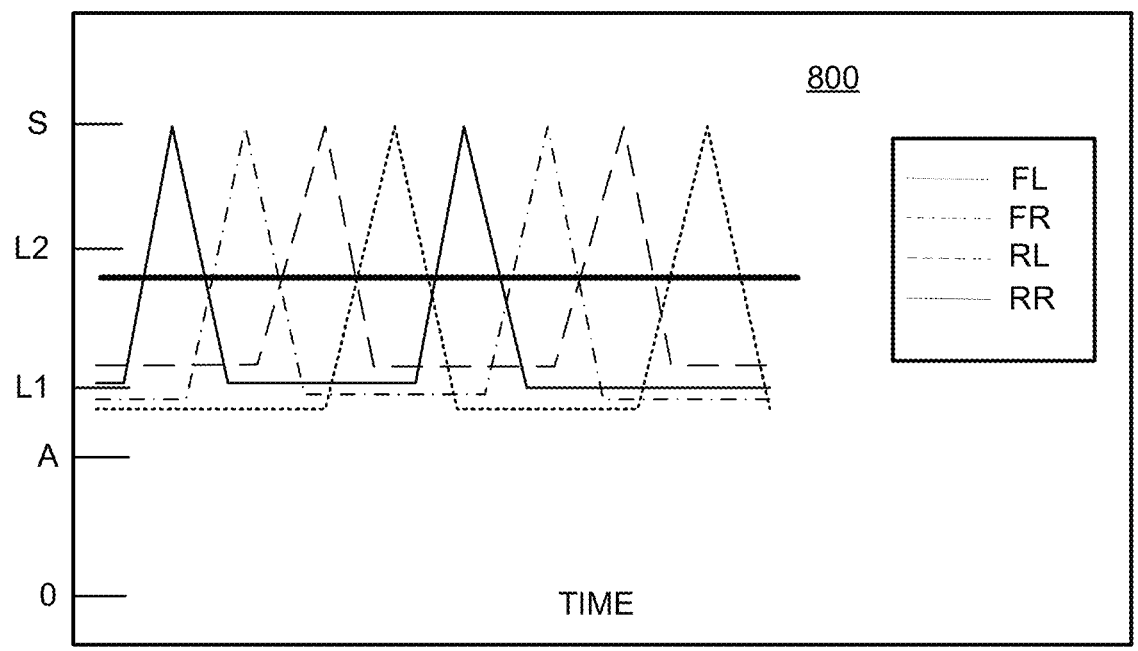
FIG. 8 shows a plot of an illustrative torque schedule for a multi-motor system, exhibiting an increased torque value in the presence of some incrementation, in accordance with some embodiments of the present disclosure.

FIG. 8 shows plot 800 of an illustrative torque schedule for a multi-motor system, exhibiting an increased torque value in the presence of some incrementation, in accordance with some embodiments of the present disclosure. As illustrated in plot 800, and similar to plots 600 and 700, torque is shown as a function of time for four motors (e.g., corresponding to FL, FR, RL, and RR). As illustrated in plot 800, the abscissa is in units of time, while the ordinate is in units of torque (e.g., Nm), per motor, normalized in and suitable manner. In plot 800, similar to plots 600 and 700, "A" corresponds to a first torque command for a motor, "L1" refers to a stall torque capacity for a motor, "L2" refers to a near-stall torque capacity for a motor, and "S" refers to a wheel slip torque (e.g., which may depend on characteristics of the ground and tire). As the desired torque increases beyond the stall torque limit, the system may determine to modify the torque schedule by increasing the average or effective torque value. In some circumstances, incremental movement of the motor may correspond to an increase in the torque limit, because of the effective small amount of motion (e.g., low speed). For example, because the motor may move incrementally, the current load, and thus cooling load, may change, and thus is spread more evenly among the phases. This allows a higher torque to be commanded because the current in each phase changes in time.

Referencing plot 700 of FIG. 7, incremental wheel movement may result from modulating the torque command. Because incremental wheel movement is achieved, operator requests for a torque command over the stall rating of each motor can be met while the vehicle can still be in a stall condition or very near a stall condition. The torque rating for each motor may be increased due to the incremental motion (e.g., increased from L1 to L2), and thus a larger average value of torque may be achieved without overheating the motors, as shown in plot 800. As illustrated, in some embodiments, the torque valley value (e.g., the value of the minimum torque value of the torque schedule) is increased while the maximum torque command value is maintained at the wheel slip torque S. Thus, the wheel may be provided with increased torque yet incur only incremental slip. In some embodiments, to achieve a greater average torque value without incurring more than incremental slip, one or more peaks in torque may be widened (e.g., a pulse width modulation), a shape or contour in the torque schedule may be modified, a new type of torque schedule may be selected, a pulse density may be increased (e.g., more peaks per time duration), any other suitable modification of a torque schedule may be made, or any combination thereof may be applied.

In some embodiments, the system may use a torque schedule to help support traction and wheel slip control systems. For example, the surface coefficient of friction may be calculated, or otherwise estimated, from the torque measured during wheel incrementation. This information may be used by the system to quicken response time, improve performance, and improve operator experience, by modifying the torque command based at least in part on the wheel slip torque, coefficient of friction, or both. For example, the stall torque limits may be stored in memory (e.g., indexed by speed as either a function or a reference database).

In an illustrative example, merely for purposes of illustration in the context of FIGS. 6-8, A may correspond to 50 Nm, L1 may correspond to 60 Nm, L2 may correspond to 90 Nm and S may correspond to 200 Nm. Based on these illustrative numerical values, any torque request under 50 Nm may exhibit a relatively constant torque schedule in time (e.g., be unmodulated). The system may identify the desired torque and then determine whether to modulate the torque request based on a function, a reference table, any other suitable reference information, or any combination thereof. In this example, if the torque command is 50 Nm, then, because the desired torque is less than the stall torque limit, the system need not adjust, modify, or modulate the torque command because the motor(s) are unlikely to overheat (e.g., illustrated in plot 600). As the torque command is increased, for example to 60 Nm, then the system may modify the torque schedule to achieve the desired torque value of 60 Nm, while just allowing incremental rotation of the motor by achieving the wheel slip torque of 200 Nm at peak torque values. In this example, as the motor achieves some incremental movement, the torque capacity of the motor may increase to 90 Nm, which allows a higher torque command to be achieved by further modifying the torque schedule (e.g., by raising the torque valleys while maintaining the torque peaks at the "S" value as needed).

Figure 9:
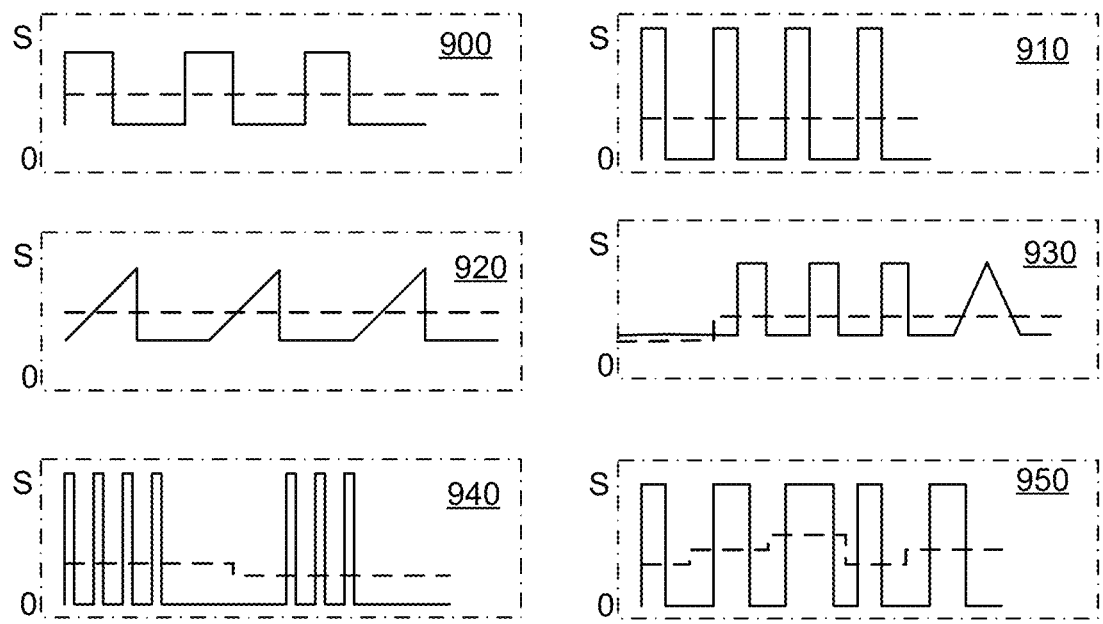
FIG. 9 shows illustrative torque schedules for a motor, in accordance with some embodiments of the present disclosure.

FIG. 9 shows illustrative torque schedules for a motor, in accordance with some embodiments of the present disclosure. Torque schedules may include any suitable temporal, or otherwise sequential, set of torque values used to affect torque generated by one or more motors. A torque schedule may include a single value (e.g., a single time-torque value, a constant value over time), a set of torque values (e.g., an array, a vector, a matrix, a sequence of values), a set of torque and time values (e.g., a torque-time function, a set of temporal torque values, a set of torque-index values (e.g., sequential torque values), a function having one or more predetermined values (e.g., coefficients, offsets, any other parameters), any other suitable set of one or more values, or any combination thereof. Any of the illustrative torque schedules, parameters thereof, or aspects thereof illustrated in panels 900-950, and any other suitable features may be combined or otherwise used in concert to manage torque at one or more wheels of a vehicle. The effective torque values in each panel are illustrated by the dashed line.

Panel 900 illustrates a torque schedule including a square wave and an offset. For example, the torque schedule shown in panel 900 may include a modified torque command (e.g., corresponding to the one or more motors), that includes a modification (e.g., a square wave) and a baseline torque commands (e.g., the minimum values of the modified square wave, the average value, or some other suitable value). To illustrate, the unmodified square wave may include a zero average value to which an offset is added to generate the modified torque command, or the unmodified square wave may include a zero minimum value to which an offset is added to generate the modified torque command. In either case, the offset may correspond to the baseline torque command and the square wave may correspond to the modification. In some embodiments, a torque schedule may be parameterized by an offset value, a frequency (e.g., or a period), a duty cycle, an amplitude, any other suitable parameter affecting the shape and value of the torque command, or any combination thereof. Any or all of these parameters may be selected, modified, or otherwise used by a system to generate a torque schedule that corresponds to a torque command. For example, the system may select a square wave (e.g., or any suitable shape), having a characteristic average value, and add an offset to the square wave to achieve a desired average value (e.g., the torque command). In some embodiments, the system may select the frequency, vary the frequency, or otherwise control the frequency to avoid resonance, excitation of vibration modes (e.g., of the vehicle body, of the suspension system), or both to lessen the perceptibility of any incremental motion to the operator.

Panel 910 illustrates a torque schedule without an offset. For example, the torque schedule shown in panel 910 may include a modified torque command (e.g., corresponding to the one or more motors) that includes a modification (e.g., a modified amplitude) and a baseline torque command (e.g., an unmodified square wave). To illustrate, the unmodified square wave may include a nonzero average value, which, when scaled by modifying the amplitude, generates the modified torque command. In some embodiments, a torque schedule may be parameterized by a frequency (e.g., or a period), a duty cycle, an amplitude, any other suitable parameter affecting the shape and value of the torque command, or any combination thereof. Any or all of these parameters may be selected, modified, or otherwise used by a system to generate a torque schedule that corresponds to a torque command. For example, the system may select a square wave (e.g., or any suitable shape), and scale the amplitude of the square wave to achieve a desired average value (e.g., the torque command). In some embodiments, the torque schedule includes a minimum value of zero, or near zero (e.g., which may, but need not, correspond to a zero current condition).

Panel 920 illustrates a torque schedule including a triangular wave. For example, the torque schedule shown in panel 910 may include a modified torque command (e.g., corresponding to the one or more motors), that includes a baseline torque command (e.g., and offset) and a modification (e.g., a triangular wave). To illustrate, the unmodified triangular wave may include a nonzero average value, which when scaled by modifying the amplitude, generates the modified torque command. To illustrate further, the unmodified triangular wave may include a zero average value, which is then offset to generate the modified torque command having the desired average value. In some embodiments, a torque schedule may be parameterized by a frequency (e.g., or a period), a duty cycle, an amplitude, a shape type, any other suitable parameter affecting the shape and value of the torque command, or any combination thereof. Any or all of these parameters may be selected, modified, or otherwise used by a system to generate a torque schedule that corresponds to a torque command. For example, the system may select a triangular wave (e.g., a forward or backwards sawtooth, or any suitable shape), having a characteristic average value, and add an offset to the square wave to achieve a desired average value (e.g., the torque command). In some embodiments, the torque schedule includes a series of repeating peaks having any suitable shape (e.g., square, triangular, sinusoidal, piecewise functions, polynomials, or a combination thereof). In some embodiments, a torque schedule may include a peak with flat portions before and/or after the peak, with the flat portion(s) being shorter than, the same as, or longer than the duration of the peak. For example, as illustrated in panel 920, the duration of the triangular peaks and the duration of the intermediate flat portions between peaks are approximately equal.

Panel 930 illustrates a transition among torque schedules. As illustrated, the system employs a torque schedule equal to a torque command (e.g., without modulation but not necessarily constant), followed by a square wave with offset, followed by a triangular wave. For example, panel 930 may correspond to a circumstance wherein the desired torque is initially below a stall torque limit and then increases beyond the stall torque limit, and then the torque schedule is modified in shape. The square wave and triangular wave may be scaled by modifying the amplitude, offset from zero, or both to result in a desired average value.

Panel 940 illustrates a torque schedule having peaks with varying density. In some embodiments, the system may apply PDM to vary the effective torque that is applied. In some embodiments, each pulse or peak is similarly shaped, but the frequency of occurrence is varied to vary the effective applied torque. For example, as illustrated, a reduced density of pulses results in a lesser torque command. The pulses may include a pulse waveform that is scaled, offset, or both to result in the desired pulse shape. For example, the baseline signal may correspond to the offset, to which a scaled and/or offset pulse is added to result in the modified torque command.

Panel 950 illustrates a torque schedule having peaks with varying width. In some embodiments, the system may apply PWM to vary the effective torque that is applied. In some embodiments, the duration of each pulse or peak is varied to vary the effective applied torque. For example, as illustrated, a reduced width of pulses results in a lesser torque command. The pulses may include a pulse waveform that is scaled, offset, or both to result in the desired pulse shape. For example, the baseline signal may correspond to an offset and/or a width, to which scaling and/or offset is added to result in the modified torque command.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method for managing motor torque in a vehicle, the method comprising:
    determining a stall torque limit based on motor speed and a thermal characteristic of one or more motors;
    determining one or more baseline torque commands corresponding to a desired torque value;
    if the desired torque value is less than the stall torque limit, generating the one or more baseline torque commands corresponding to the one or more motors; and
    if the desired torque value is greater than the stall torque limit, generating one or more modified torque commands corresponding to the one or more motors based on a modification to the one or more baseline torque commands, wherein each of the one or more modified torque commands corresponds to an effective torque value greater than the stall torque limit.

2. The method of claim 1, wherein generating the one or more modified torque commands comprises:
    retrieving reference information;
    modifying the one or more baseline torque commands to generate the one or more modified torque commands based on the reference information; and
    transmitting the one or more modified torque commands to a power electronics system coupled to the one or more motors.

3. The method of claim 1, wherein each of the one or more modified torque commands comprises:
    a baseline torque command of the one or more baseline torque commands; and
    at least one of a square wave, a pulse-modulated wave, a pulse density wave, a sawtooth wave, a triangular wave, a sinusoidal wave, or a piecewise functional wave.

4. The method of claim 1, further comprising determining whether to generate the modification to the one or more baseline torque commands based on
    whether the desired torque value is within a reference operating range for the motor speed.

5. The method of claim 1, wherein the one or more modified torque commands comprises a time-average value indicative of the desired torque value.

6. The method of claim 1, further comprising retrieving reference information based on the motor speed, wherein the reference information comprises the stall torque limit.

7. The method of claim 1, wherein determining the desired torque value comprises receiving an input from an operator input interface indicative of the desired torque value.

8. The method of claim 1, further comprising:
    determining a peak torque command corresponding to a wheel slip torque, wherein a peak of the one or more modified torque commands corresponds to the peak torque command; and
    causing at least one of the one or more motors to increment in angular position based on the one or more modified torque commands.

9. The method of claim 1, wherein each of the one or more modified torque commands comprises:
    a minimum value that is less than the stall torque limit; and
    a maximum value that corresponds to a wheel slip torque.

10. A method for managing motor torque in a vehicle, the method comprising:
    identifying, for each of one or more motors, an operating range based on a rotational motor speed and based on a desired torque value;
    retrieving a reference operating range from memory, wherein the reference operating range is based on a thermal characteristic of the one or more motors;
    determining a torque command mode based on the operating range and the reference operating range;
    applying a first torque command mode if the operating range is within the reference operating range; and
    applying a second torque command mode if the operating range is not within the reference operating range, wherein the second torque command comprises a baseline command and a modulation, and wherein the second modified torque command corresponds to an effective torque value greater than the reference operating range.

11. A system comprising:
    a sensor configured to sense motor speed of one or more motors; and
    control circuitry coupled to the sensor and configured to:
        determine a stall torque limit based on the motor speed and a thermal characteristic of the one or more motors;
        determine one or more baseline torque commands corresponding to a desired torque value;
        if the desired torque value is less than the stall torque limit, generate the one or more baseline torque commands corresponding to the one or more motors; and
        if the desired torque value is greater than the stall torque limit, generate one or more modified torque commands corresponding to the one or more motors based on a modification to the one or more baseline torque commands, wherein each of the one or more modified torque commands corresponds to an effective torque value greater than the stall torque limit.

12. The system of claim 11, further comprising a power electronics system coupled to the control circuitry and to the one or more motors.

13. The system of claim 12, wherein generating the one or more modified torque commands comprises:
    retrieving reference information;
    modifying the one or more baseline torque commands to generate the one or more modified torque commands based on the reference information; and
    transmitting the one or more modified torque commands to the power electronics system.

14. The system of claim 11, wherein each of the one or more modified torque commands comprises:
    a baseline torque command of the one or more baseline torque commands; and at least one of a square wave, a pulse-modulated wave, a pulse density wave, a sawtooth wave, a triangular wave, a sinusoidal wave, or a piecewise functional wave.

15. The system of claim 11, wherein the control circuitry is further configured to determine whether to generate the modification to the one or more baseline torque commands by:
   determining a reference operating range; and
   determining whether the motor speed and the desired torque value are within the reference operating range.

16. The system of claim 11, wherein the one or more modified torque commands comprises a time-average value indicative of the desired torque value.

17. The system of claim 11, wherein the control circuitry is further configured to retrieve reference information based on the motor speed, wherein the reference information comprises the stall torque limit.

18. The system of claim 11, wherein the control circuitry is configured to determine the desired torque value by receiving an input from an operator input interface indicative of the desired torque value.

19. The system of claim 11, wherein the control circuitry is further configured to:
   determine a peak torque command corresponding to a wheel slip torque, wherein a peak of the one or more modified torque commands corresponds to the peak torque command; and
   cause at least one of the one or more motors to increment in angular position based on the one or more modified torque commands.

20. The system of claim 11, wherein each of the one or more modified torque commands comprises:
   a minimum value that is less than the stall torque limit; and
   a maximum value that corresponds to a wheel slip torque.

* * * * *